United States Patent [19]
Ewald et al.

[11] 3,898,808
[45] Aug. 12, 1975

[54] CONCENTRIC BRAKE BOOSTER WITH ACCUMULATOR
[75] Inventors: Jerome T. Ewald; Richard L. Lewis, both of South Bend, Ind.
[73] Assignee: The Bendix Corporation, South Bend, Ind.
[22] Filed: June 20, 1974
[21] Appl. No.: 481,090

[52] U.S. Cl. .................. 60/403; 60/413; 60/582
[51] Int. Cl. ........................................... F15b 20/00
[58] Field of Search ............. 60/403, 404, 405, 413, 60/582

[56] References Cited
UNITED STATES PATENTS
3,229,467   1/1966   Lepelletier .................. 60/582 X
3,677,007   7/1972   Goscenski .................... 60/582 X Primary Examiner—Edgar W. Geoghegan
Attorney, Agent, or Firm—Ken C. Decker; William N. Antonis

[57] ABSTRACT

A hydraulic brake booster is disclosed which uses a single fluid to both actuate the vehicle's brakes and to provide a hydraulic assist to the vehicle operator. The booster is designed for use in a vehicle hydraulic system having both a primary pressure source which is normally used to operate the brake booster, and a secondary pressure source which is used upon failure of the primary pressure source. Pressure communication is initiated between the secondary pressure source and the booster pressure chamber by a pressure differential responsive piston. One face of the piston is split into two sections, each of which is communicated to the fluid pressure in one of the vehicle's braking circuits, and the other face of the piston is communicated to the pressure level in the booster pressure chamber. When pressure is developed in either of the vehicle braking circuits in the absence of fluid pressure communication into the pressure chamber, the pressure differential responsive piston actuates a valve which initiates communication between the secondary pressure source and the booster pressure chamber. The booster further includes a sealing device which seals the pressure chamber from the valve controlling communication between the pressure chamber and the primary pressure source during operation of the booster by the secondary pressure source.

13 Claims, 3 Drawing Figures

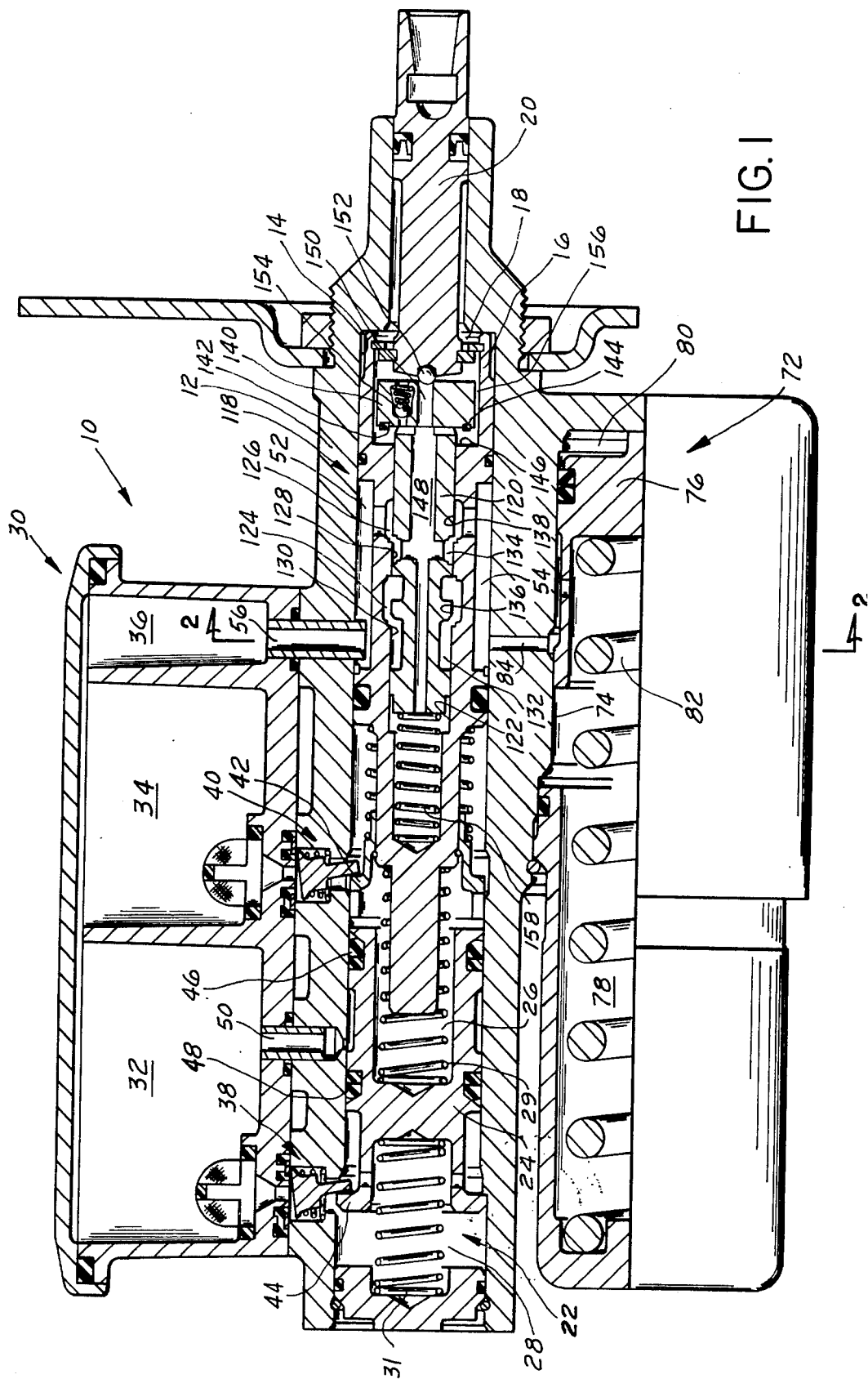

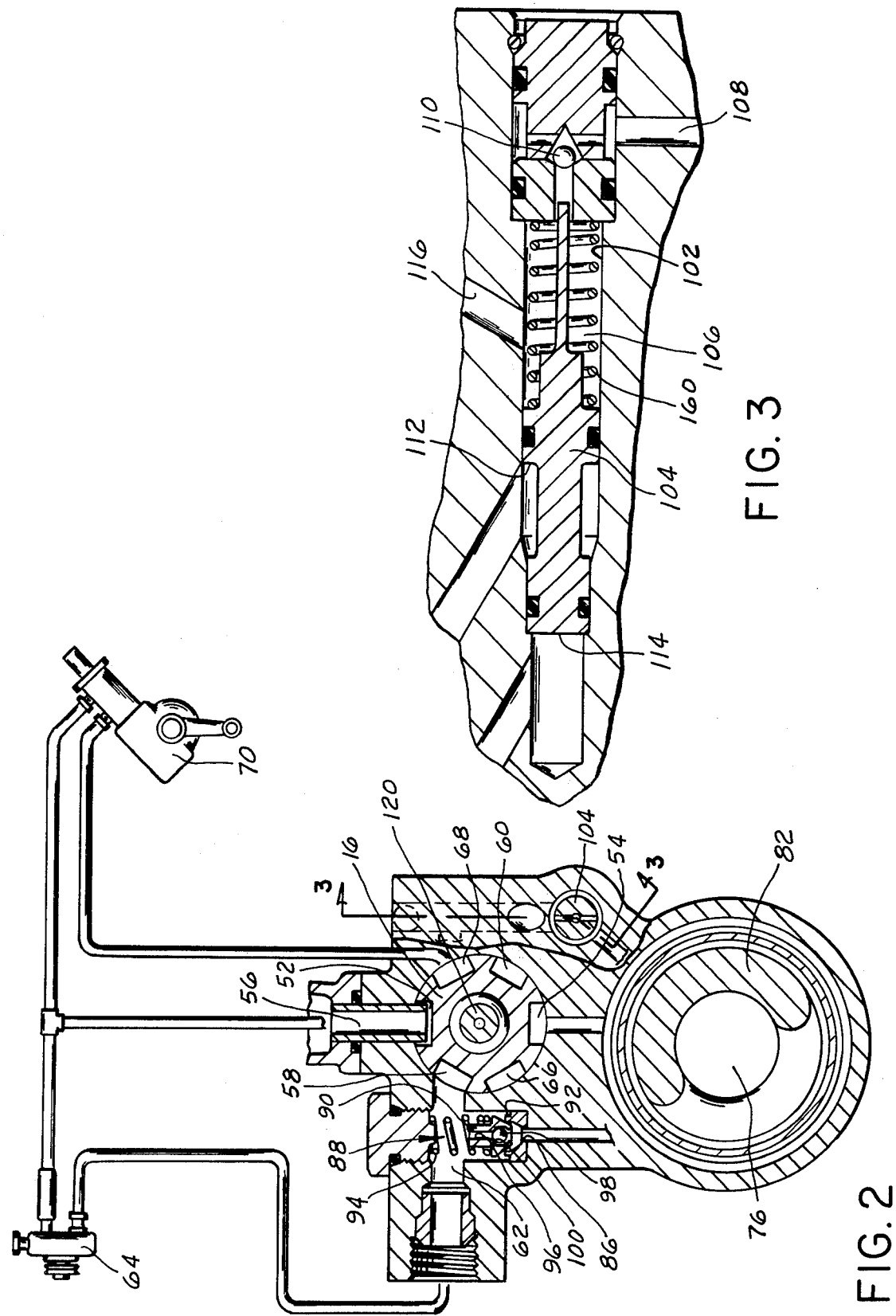

3,898,808

CONCENTRIC BRAKE BOOSTER WITH ACCUMULATOR

BACKGROUND OF THE INVENTION

This invention relates to the common fluid hydraulic brake boosters operable with either primary or secondary fluid pressure sources.

Due to their smaller size or weight, hydraulically actuated brake boosters are expected to be used in the near future in lieu of the existing vacuum boosters in automotive vehicles equipped with power brakes. Because of the development of the appropriate fluid technology, it has become possible to design a hydraulic brake booster which uses a common fluid to both provide the motive force operating the brake booster and to communicate through the vehicle braking circuits to actuate the front and rear brakes of the vehicle. Consequently, it is possible to design a hydraulic brake booster in which the master cylinder and booster are constructed as an integral unit, as shown, for example in my U.S. Pat. No. 3,761,140. However, it is desirable to provide an auxiliary pressure source to actuate the brake booster upon failure of the primary pressure source, since in a hydraulic brake booster, failure of the primary pressure source results in immediate loss of power braking unless the secondary source is provided. On the other hand, conventional vacuum brake boosters permit a finite number of brake applications even after the vehicle engine has discontinued operation. Prior art mechanisms for actuating the secondary pressure source upon failure of the primary pressure source for hydraulic brake boosters are disclosed in U.S. Pat. Nos. 3,638,528 and 3,802,195. Both of these prior art devices require mechanical linkages to effect actuation of the secondary pressure source. Furthermore, since an accumulator is conventionally used as a secondary pressure source, and because of the finite volume of the accumulator, the number of brake applications which can be accomplished by the secondary pressure source is limited, prior art mechanisms suffer from the disadvantage that during operation of the booster by the accumulator, the accumulator leaks through the lands and grooves of the operator-actuated valve.

SUMMARY OF THE INVENTION

Therefore, an important object of our invention is to provide a common fluid hydraulic brake booster having both primary and secondary fluid pressure sources, and in which the secondary fluid pressure source is actuated hydraulically upon failure of the primary pressure source.

Another important object of our invention is to provide a hydraulic brake booster which may be actuated by both primary and secondary fluid pressure sources, and in which the actuating device for the secondary pressure source does not require any complicated linkage arrangements for its actuation.

Another important object of our invention is to provide a common fluid hydraulic brake booster having primary and secondary fluid pressure sources in which linkage from the pressure chamber during operation of the booster using the secondary fluid pressure source is substantially prevented.

Still another important object of our invention is to increase the number of brake applications which may be accomplished when an accumulator is used as the secondary fluid pressure source of a common fluid hydraulic brake booster.

DESCRIPTION OF THE DRAWINGS

FIG. 1 is a fragmentary, longitudinal cross-sectional view of the brake booster made pursuant to the teachings of our present invention;

FIG. 2 is a fragmentary cross-sectional view taken substantially along line 2—2 of FIG. 1 and which also illustrates the installation of the brake booster made pursuant to the teachings of our present invention in a vehicle hydraulic system; and FIG. 3 is an enlarged fragmentary cross-sectional view of the valve mechanism which actuates the auxiliary fluid supply, taken substantially along line 3—3 of FIG. 2.

DETAILED DESCRIPTION

Referring now to the drawings, a brake booster generally indicated by the numeral 10 includes a housing 12 defining a bore 14 therewithin. A primary piston 16 is slidably mounted in the bore 14, and cooperates with one end of the latter to define a pressure chamber 18 therebetween. One end of an operator-actuated input rod 20 is connected to the usual brake pedal (not shown) mounted in the vehicle operator's compartment, and the other end of the input rod 20 extends into the pressure chamber 18. The opposite end of the piston 16 cooperates with the corresponding end of the bore 14 to define a chamber generally indicated by the numeral 22. A secondary piston piston 24 divides the chamber 22 into first and second sections 26, 28, respectively. The sections 26 and 28 are connected to the two vehicle braking circuits in the conventional manner; for example, the section 26 may be communicated to the front wheel brakes of the vehicle and the section 28 may be communicated to the rear wheel brakes of the vehicle. Consequently, the sections 26 and 28 and the pistons 16 and 24 function in the same manner as does a conventional split system master cylinder, which has been used for many years. Return springs 29, 31 urge the pistons 16 and 24 to the brake-release position illustrated in the drawing.

A vessel generally indicated by the numeral 30 is mounted on the upper edge of the housing 12 and is provided with partitions which divide the vessel 30 into a first compartment 32, a second compartment 34, and a third compartment 36. A conventional tilt valve 38 controls communication between the compartment 32 and the section 28, and an identical tilt valve 40 controls communication between the compartment 34 and the section 26. The pistons 16, 24 are each provided with detents 42, 44 which hold the tilt valves 38, 40 open when the pistons are disposed in the brake-released position illustrated in the drawings. Of course, when the pistons are moved away from the brake-released position, the tilt valves 38 and 40 are urged closed. The area between the seals 46, 48 on the piston 24 is communicated into the reservoir compartment 32 by passage means 50.

As is most clearly illustrated in FIG. 2, six circumferentially spaced, axially extending slots are provided in the outer circumferential surface of the piston 16. Slots 52, 54 are communicated to the reservoir compartment 36 through passage 56. Slots 58, 60 are communicated with an inlet port 62, which in turn is communicated to the outlet or high pressure side of the vehicle power steering pump 64. The vessel 30, and each of the chambers 32, 34, and 36 therein, are communicated to the pump reservoir (not shown) at the inlet or low pressure side of the pump 64, so that the pump 64 draws from the pump reservoir and supplies pressurized fluid to the inlet port 62. Upon release of the brakes, fluid communicates back into vessel 30, and the overflow from vessel 30 is transferred back to the pump reservoir (not shown). Slots 66, 68 are communicated to the inlet of the conventional vehicle power steering gear 70, and the outlet of the steering gear 70 is also communicated to the inlet of the pump 64 and to the vessel 30. 98

The pump 64 constitutes the primary vehicle pressure source, and a vehicle secondary pressure source consists of an accumulator generally indicated by the numeral 72 which is integral with the housing 12. Accumulator 72 includes still another bore 74 defined within the housing 12, and an accumulator piston 76 is slidably mounted in the bore 74. The piston 76 cooperates with opposite ends of the bore 74 to define variable volume chambers 78, 80 between opposite ends of the piston 76 and corresponding ends of the bore 74. A relatively heavy spring 82 yieldably urges the piston 76 to the right viewing FIG. 1, into the chamber 80. The passage 84 vents the chamber 78 to the slot 54 and consequently to the reservoir chamber 36. A charging passage 86 communicates the chamber 80 with the inlet port 62. Accumulator valve generally indicated by numeral 88 controls communication into the passage 86 and includes a first valve member 90 which is urged against a valve seat 92 on the passage 86 by a spring 94. Another passage 96 extends through the valve member 90, and a ball check valve 89 controls fluid communication through the passage 96. When the fluid pressure level in the inlet port 62 is greater than the fluid pressure level in the accumulator chamber 80, the check valve 98 will be urged away from its seat 100 in the passage 96 to permit communication into the chamber 80.

Still another bore 102 is defined within the housing 12, which slidably receives a piston 104. The right hand face (viewing FIG. 3) of the piston 104 cooperates with corresponding end of the bore 102 to define a fluid pressure chamber 106 therewithin. A passage 108 communicates the chamber 106 with the chamber 80 of the accumulator 72, and a check valve 110 controls communication between the passage 108 and the chamber 106. The opposite end of the piston 104 is provided with a first face 112 which is sealingly separated from a second face 114. The face 112 is communicated to the fluid pressure level in the section 26, and therefore to the braking pressure in one of the braking circuits. The face 114 is communicated to the fluid pressure level in the section 28 and therefore to the braking pressure in the other circuit. Still another passage 116 communicates the chamber 106 with the pressure chamber 18.

Referring to FIG. 1, communication between the primary pressure source 64 in the pressure chamber 18 is controlled by a valve means generally indicated by the numeral 118. Valve means 118 includes a spool valve 120 which is slidably mounted in a bore 122 defined within the piston 16. The circumferential surface of the bore 122 is provided with grooves 124, 126 and lands 128 and 130. The spool valve 120 is provided with complimentary grooves 132 and 134 and cooperating lands 136 and 138. Groove 132 is communicated with the slots 66, 68 and therefore is also communicated with the inlet or high pressure side of the steering gear 70. Similarly, groove 124 is communicated with the slots 58, 60 and therefore to the outlet or high pressure side of the pump 64. As can be seen by viewing FIG. 1, the groove 126 is communicated to the slots 52, 54 and therefore to the reservoir compartment ment 36. The right hand end of the spool valve 120 terminates in a transversely extending member 140 which extends across the pressure chamber 18. The left hand face 142 of the member 140 is provided with a circumferentially extending face seal 144 which is adapted to engage the transversely extending face 146 of the piston 16. A passage 148 communicates the groove 134 with the pressure chamber 18, and a branch 150 of the passage 148 extends through the member 140. A sphere 152 carried on the end of the input member 20 is adapted to sealingly engage the branch 150 to prevent communication therethrough when the input member 20 is brought into engagement with the valve member 120. A check valve 154 provided in transversely extending member 140 permits communication through the latter from the left to the right viewing FIG. 1, but prevents communication in the reverse direction. As can also be seen in FIG. 1, a diametral clearance 156 is provided between the outer circumferential surface of the member 140 and the piston 16, so that fluid communication through this diametral clearance can supplement communication through the check valve 154 or the branch 150. The spool valve 120 is urged toward the brake-released position illustrated in the drawings by a spring 158.

MODE OF OPERATION

Various components of the booster 10 are illustrated in the positions they assume when the brakes of the vehicle are released and the accumulator is completely discharged. In this position, substantially uninhibited fluid communication is permitted from the groove 124 into the groove 132, and consequently substantially all of the fluid pressure delivered to the inlet port 62 is immediately communicated to the inlet of the steering gear 70. However, when a brake application is effected, the input rod 20 is urged to the left viewing FIG. 1, to thereby urge the spool valve 120 to the left compressing the spring 158. As the spool valve 120 is moved from the first or brake release position illustrated in the drawing to the second or brake fully applied position, the orifice defined between the lands 136 and 130 is progressively reduced thereby increasing the pressure level in groove 124. Also, the land 138 closes against the land 128 to thereby terminate the communication of the pressure chamber 18 to the reservoir through the grooves 134 and 126. At the same time, the groove 134 is opened to the groove 124 so that the fluid pressure being developed therein is communicated to the pressure chamber 18 where it acts upon the piston 16 urging the latter to the left viewing FIG. 1. As the piston 16 is moved to the left, fluid pressure is developed in the section 26, and because the piston 24 is a floating piston, fluid pressure developed in the section 26 develops a corresponding fluid pressure in the section 28. Of course, as the pistons shift, the tilt valves 38 and 40 are closed to seal the sections 26 and 28 against communication with the reservoir chambers 32 and 34. The pressure levels developed in the sections 28 and 26 are communicated through the vehicle's split braking circuit to the front and rear wheel brakes of the vehicle, respectively. When the brakes of the vehicle are released, the springs 29, 31 and 158 urge the pistons 16, 24 and the spool valve 120 back to their brake-released positions illustrated in the drawings. It will be noted that the sphere 152 sealingly engages the passage 150, so that fluid communication into that portion of the chamber 18 to the right of the member 140 will be either through the diametral clearance 156 or through the check valve 154. Of course, when the pistons 16 and 24 have returned to the brake-release position illustrated in the drawings, the tilt valves 38 and 40 are again reopened, to replenish the fluid pressure content of the sections 26 and 28.

As was discussed hereinabove, when a brake application is effected, the fluid pressure level in the groove 124, and therefore the fluid pressure level in the slots 58, 60 and the inlet port 62, is increased to a relatively high level. This relatively high pressure level in the inlet port 62 urges the check valve 98 away from its seat 100, to permit a portion of the high pressure fluid to communicate into the accumulator chamber 80 through the charging passage 86. The high pressure fluid in the chamber 80 urges the accumulator piston 76 to the left viewing FIG. 1, thereby compressing the spring 82 so that fluid under a relatively high pressure is stored in the chamber 80. Of course, after the brakes of the vehicle are released, the fluid pressure level in the groove 124, and therefore in the slots 58, 60 and the inlet port 62, returns to their usual relatively low pressure levels. When this occurs, the high pressure fluid in the accumulator chamber 80 is prevented from escaping due to the engagement of the check valve 98 with its seat 100. However, should the fluid pressure level in chamber 80 increase to a dangerously high level, due to thermal expansion of the fluid stored therein or for any other reason, the fluid pressure in the chamber 80 will react on the lower end of the valve member 90, overcoming the spring 94, to vent a portion of the pressure in the chamber 80 back to the relatively low pressure existing at the inlet port 62 during brake release. Consequently, the fluid pressure level in the chamber 80 is limited, except for a very brief time period, to a fluid pressure level established by the strength of the spring 94.

When a brake application is to be effected after failure of the pump 64, the booster 10 may be actuated by using the fluid pressure content stored in the accumulator 72. When this occurs, the input rod 20 is urged to the left by the vehicle operator in the normal manner. However, since the pump 64 has failed, movement of the valve 120 will not result in fluid communication into the pressure chamber 18. Consequently the spool valve 120 is immediately shifted until the face 142 of the transversely extending member 140 is engaged with the face 146 of the piston 16, to thereby provide a direct mechanical link between the operator-actuated input rod 20 and the piston 16. Further inward movement of the operator-actuated input rod 20 will urge the piston 16 to the left viewing FIG. 1, thereby building pressure in the sections 26 and 28. The pressure levels generated in the sections 26 and 28 are communicated to the faces 112 and 114 of the piston 104, respectively. Because of the failure of fluid communication from the primary pressure source 64, the pressure level in the chamber 106 will be quite low. Consequently, when a very low pressure level is generated in the sections 26 and 28 by manual movement of the pistons, the piston 104 will be urged to the right viewing FIG. 3 against the force of the return spring 160. This movement of the piston 104 to the right opens the valve member 110 to permit fluid communication from the accumulator chamber 80 into the pressure chamber 18 through the passage 108, the chamber 106, and the passage 116. The fluid pressure thus communicated into the pressure chamber 18 reacts on the piston 16 in the normal manner to urge the latter to the left to generate braking pressure in the sections 26 and 28. It will be noted that, before actuation of the piston 104 to communicate the accumulator chamber 80 with the pressure chamber 18, the seal 144 on the face 142 of the transverse member 140 is sealingly engaged with the corresponding face 146 of the piston 16. Consequently, the pressure chamber 18 is sealed against communication with the valve 120 during operation of the booster 10 by the fluid pressure content of the accumulator chamber 80. Fluid pressure is therefore prevented from leaking from the pressure chamber 18 through the grooves and lands of the spool valve to the reservoir. In prior art devices, wherein the accumulator was usually actuated by a mechanical linkage engaging the spool valve, the pressure chamber 18 was opened to the spool valve at all times, permitting the fluid pressure content of the accumulator which had been communicated into the pressure chamber during a failure of the primary pressure source to leak through the valve. Since the pressure chamber 18 of the present invention is sealed from such leakage, the accumulator chamber 80 will not be depleted during a brake actuation if the pressure on the input rod 20 is either maintained constant or is reduced. Consequently, the number of brake actuations possible with a given quantity of fluid stored in the accumulator 72 is substantially increased in the disclosed device. Upon brake release, after a brake application is effected by using the fluid pressure content of the accumulator, the sphere 152 is moved away from passage 150, to vent chamber 18 through the valve 120.

We claim:

1. In a vehicle having primary and secondary pressure sources, a hydraulic brake actuating device comprising:

a housing defining a bore therewithin;

a primary piston slidably mounted in said bore and cooperating with one end of the latter to define a variable volume pressure chamber therebetween, said primary piston sliding with respect to said housing to effect a brake actuation when fluid pressure from either of said sources is communicated into said pressure chamber;

operator-actuated valve means for controlling communication from said primary pressure source into said pressure chamber; and fluid pressure actuated means responsive to a failure of fluid communication from said primary source into said pressure chamber upon actuation of said operator-actuated valve means, said fluid pressure actuated means thereupon initiating communication between said secondary pressure source and said pressure chamber.

2. The invention of claim 1:

said fluid pressure actuated means including pressure differential responsive means comparing the fluid pressure level in the pressure chamber with a reference pressure, said reference pressure actuating said pressure differential responsive means to communicate said secondary source to said pressure chamber when fluid pressure communication from the primary source fails.

3. The invention of claim 2; and
fluid motor means actuated by movement of said primary piston for developing braking pressure, said reference pressure being said braking pressure.

4. The invention of claim 1; and
fluid motor means actuated by movement of said primary piston for developing braking pressure in each of a pair of braking circuits, said fluid pressure actuated means including pressure differential responsive means comparing the pressure level in said pressure chamber with the pressure levels in each of said braking circuits, said pressure differential responsive means communicating said secondary pressure source to said pressure chamber when the fluid pressure level in the latter fails and the pressure level in either of braking circuits is above a predetermined value.

5. The invention of claim 1; and
fluid motor means actuated by movement of said primary piston for developing braking pressure;
said fluid pressure actuated means including a secondary bore defined within said housing, a pressure differential responsive piston having a pair of opposed fluid pressure reactive faces, slidably mounted in said bore, secondary valve means actuated by movement of said pressure differential responsive piston for communicating said pressure chamber with said secondary source, said braking pressure being communicated to one of said faces, the pressure level in the pressure chamber being communicated to the other face, whereby upon failure of the pressure acting on said other face the pressure acting on said one face moves said pressure differential responsive piston to activate said secondary valve means.

6. The invention of claim 5:
said fluid motor means including means developing braking pressure in each of a pair of braking circuits, the fluid pressure in either of said circuits being capable of actuating said pressure differential responsive piston to activate said secondary valve means.

7. The invention of claim 6:
said one face of said pressure differential responsive piston having first and second sections sealingly separated from one another, the fluid pressure developed in one of said braking circuits being communicated to one of said sections, the other braking pressure being communicated to the other section of one face, whereby upon concurrent failure of the fluid pressure level in said pressure chamber and in either of said braking circuits, the fluid pressure level in the other circuit actuates said pressure differential responsive piston to activate said secondary valve means.

8. The invention of claim 5; and
sealing means responsive to said failure of communication from said primary source into said pressure chamber to seal the pressure chamber from said operator-operated valve means to prevent fluid from leaking from said pressure chamber through said valve means.

9. The invention of claim 8:
said operator-actuated valve means including a primary piston concentrically mounted within said spool valve and shiftable from a first position venting said pressure chamber to a second position, said spool valve communicating successively higher fluid pressure levels into said pressure chamber as said spool valve is shifted toward said second position, said sealing means being disposed in said pressure chamber and carried by said spool valve, passage means extending through said piston communicating said primary pressure source with the pressure chamber, said spool valve controlling communication through said passage means, said sealing means sealingly engaging said piston to prevent communication through the passage means when the spool valve is shifted to the second position.

10. The invention of claim 8:
said operator-actuated means being a spool valve shiftable from a first position venting said pressure chamber to a second position, said spool valve communicating successively higher pressure levels into said pressure chamber as said spool valve is shifted, said sealing means being carried by the spool valve and preventing communication between the pressure chamber and the spool valve when the latter is shifted to the second position.

11. In a vehicle having primary and secondary pressure sources, a hydraulic brake actuating device comprising:
a housing defining a bore therewithin;
a primary piston slidably mounted in said bore and cooperating with one end of the latter to define a variable volume pressure chamber therebetween, said primary piston sliding with respect to said housing to effect a brake actuation when fluid pressure from either of said sources is communicated into said pressure chamber;
operator-actuated valve means for controlling communication from said primary pressure source into said pressure chamber;
means responsive to a failure of fluid communication from said primary source into said pressure chamber upon actuation of said valve means to thereupon initiate communication between said secondary pressure source and said pressure chamber; and
means responsive to said failure of communication from said primary source into said pressure chamber to seal the pressure chamber from said operator-actuated valve means to prevent fluid from leaking from said pressure chamber through said valve means.

12. The invention of claim 11:
said operator-actuated valve means including a spool valve concentrically mounted within said primary piston and shiftable from a first position venting said pressure chamber to a second position, said spool valve communicating successively higher fluid pressure levels into said pressure chamber as said spool valve is shifted toward said second position, said sealing means being disposed in said pressure chamber and carried by said spool valve, passage means extending through said piston communicating said primary pressure source with the pressure chamber, said spool valve controlling communication through said passage means, said sealing means sealingly engaging said piston to prevent communication through the passage means when the spool valve is shifted to the second position.

13. The invention of claim 11:
said operator-actuated means being a spool valve shiftable from a first position venting said pressure chamber to a second position, said spool valve communicating successively higher pressure levels into said pressure chamber as said spool valve is shifted, said sealing means being carried by the spool valve and preventing communication between the pressure chamber and the spool valve when the latter is shifted to the second position.

* * * * *

UNITED STATES PATENT AND TRADEMARK OFFICE
CERTIFICATE OF CORRECTION

PATENT NO. : 3,898,808
DATED : August 12, 1975
INVENTOR(S) : JEROME T. EWALD and RICHARD L. LEWIS It is certified that error appears in the above-identified patent and that said Letters Patent are hereby corrected as shown below:

Column 3, Line 12, after the period, delete "98".

Line 33, delete "89" and insert ---98---.

Column 8, Line 1, after "a" insert ---spool valve---.

Lines 1 & 2, delete "primary piston".

Line 3, delete "spool valve" and insert ---primary piston---.

Signed and Sealed this twenty-fifth Day of November 1975

[SEAL]

Attest:

RUTH C. MASON
Attesting Officer

C. MARSHALL DANN
Commissioner of Patents and Trademarks